(No Model.) 5 Sheets—Sheet 1.

W. P. WIDDIFIELD & A. T. BUTTON.
CAR BRAKE.

No. 265,200. Patented Sept. 26, 1882.

Witnesses.

Lewis Tomlinson

F. Barnard Fetherstonhaugh

Inventors.

W. P. Widdifield
A. T. Button
by Ridout, Aird & Co.
Attorneys.

(No Model.) 5 Sheets—Sheet 3.
W. P. WIDDIFIELD & A. T. BUTTON.
CAR BRAKE.
No. 265,200. Patented Sept. 26, 1882.
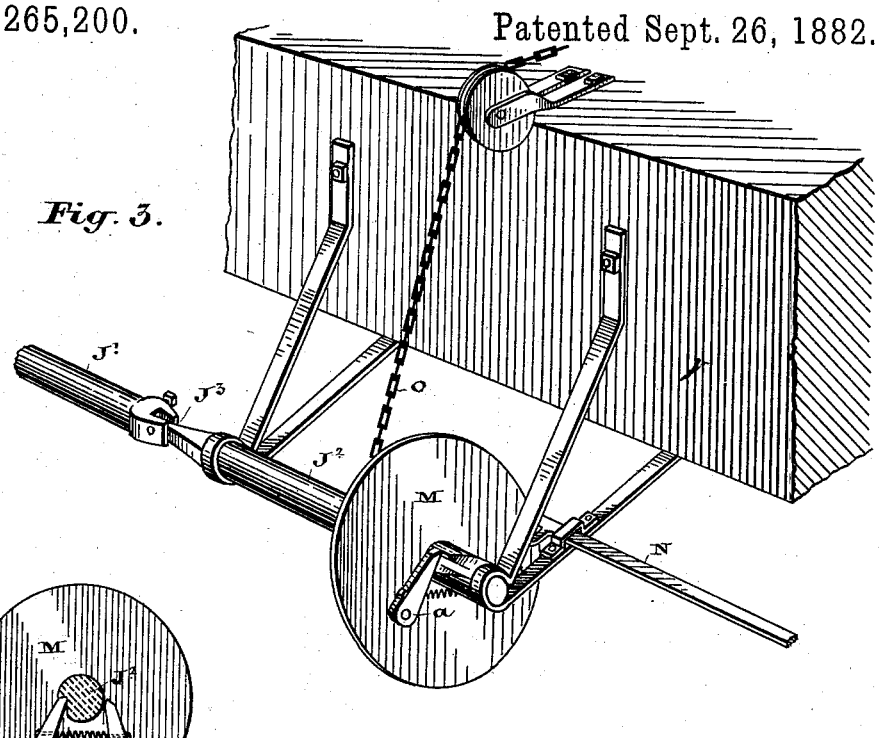
Fig. 3.
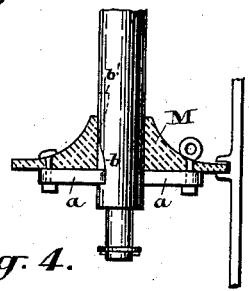
Fig. 5.
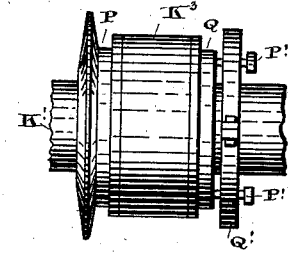
Fig. 4.
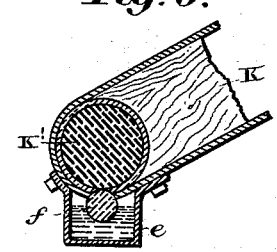
Fig. 6.
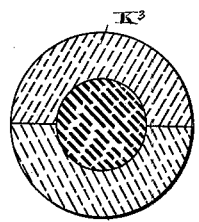
Fig. 7.
Fig. 8.
Witnesses.
Lewis Tomlinson
F. Barnard Fetherstonhaugh
Inventors.
W. P. Widdifield
A. T. Button
by Ridout, Aird &c.
Attorneys.

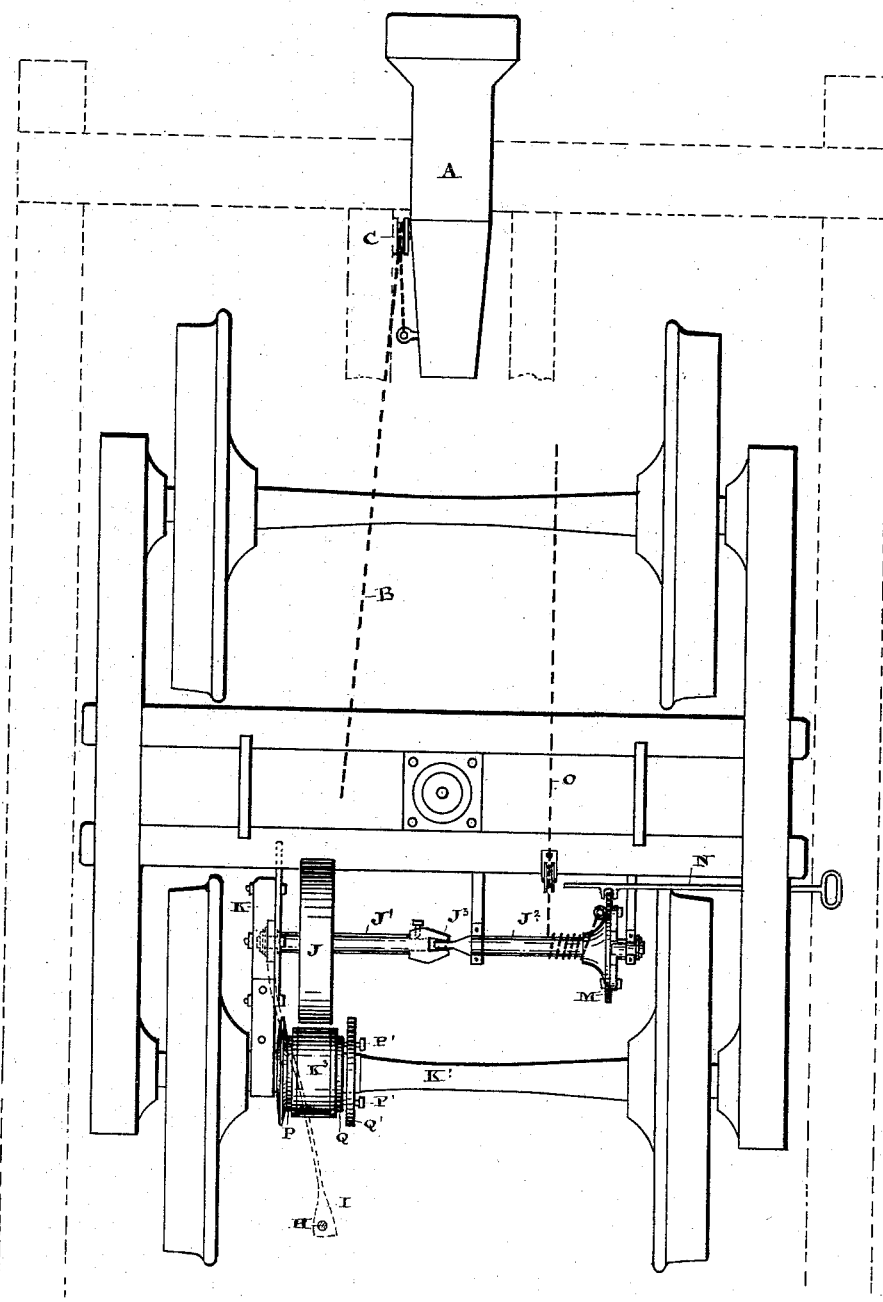

(No Model.) 5 Sheets—Sheet 5.
W. P. WIDDIFIELD & A. T. BUTTON.
CAR BRAKE.
No. 265,200. Patented Sept. 26, 1882.
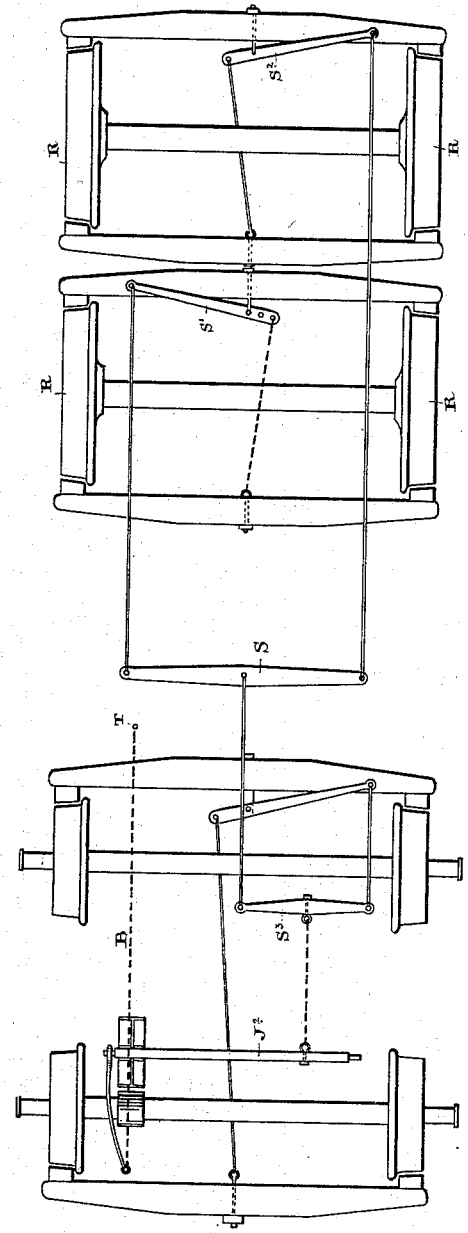
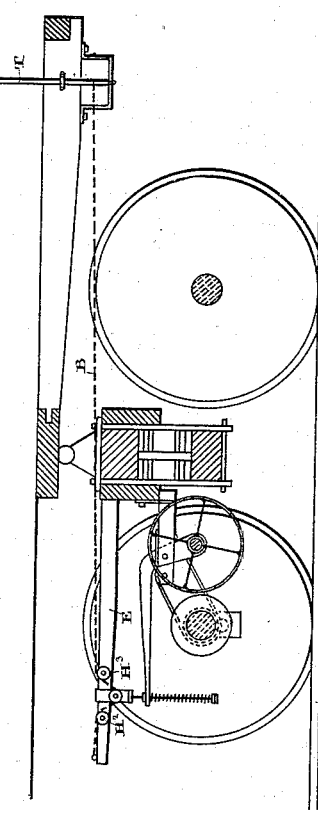
Witnesses.
Lewis Tomlinson
F. Barnard Fetherstonhaugh
Inventors.
W. P. Widdifield
A. T. Button
by Ridout, Aird & Co
Attorneys.

UNITED STATES PATENT OFFICE.

WATSON P. WIDDIFIELD AND ANSON T. BUTTON, OF UXBRIDGE, ONTARIO, CANADA.

CAR-BRAKE.

SPECIFICATION forming part of Letters Patent No. 265,200, dated September 26, 1882.

Application filed February 17, 1882. (No model.)

*To all whom it may concern:*

Be it known that we, WATSON PLAYTER WIDDIFIELD and ANSON TODD BUTTON, both subjects of the Queen of Great Britain, residing at the village of Uxbridge, in the county of Ontario, in the Province of Ontario, Canada, have invented certain new and useful Improvements in an Apparatus for Operating Railroad-Car Brakes, of which the following is a specification.

Our invention relates to that class of car-brakes in which the power to apply the brakes is derived from a friction-pulley placed upon one of the revolving axles of the car and arranged to operate mechanism specially designed for the purpose of utilizing the movement of the axle for the purpose of applying the brake.

The principal object of the invention is to arrange the mechanism so that its movement shall be automatically operated by the motion of the car, and in so arranging the friction-gear that no greater strain shall be applied thereto than is necessary to effect the desired purpose; and it consists, among other things, in connecting the two draw-heads of the car together by a chain passing through and operating certain mechanism, more particularly explained.

Figure 1:
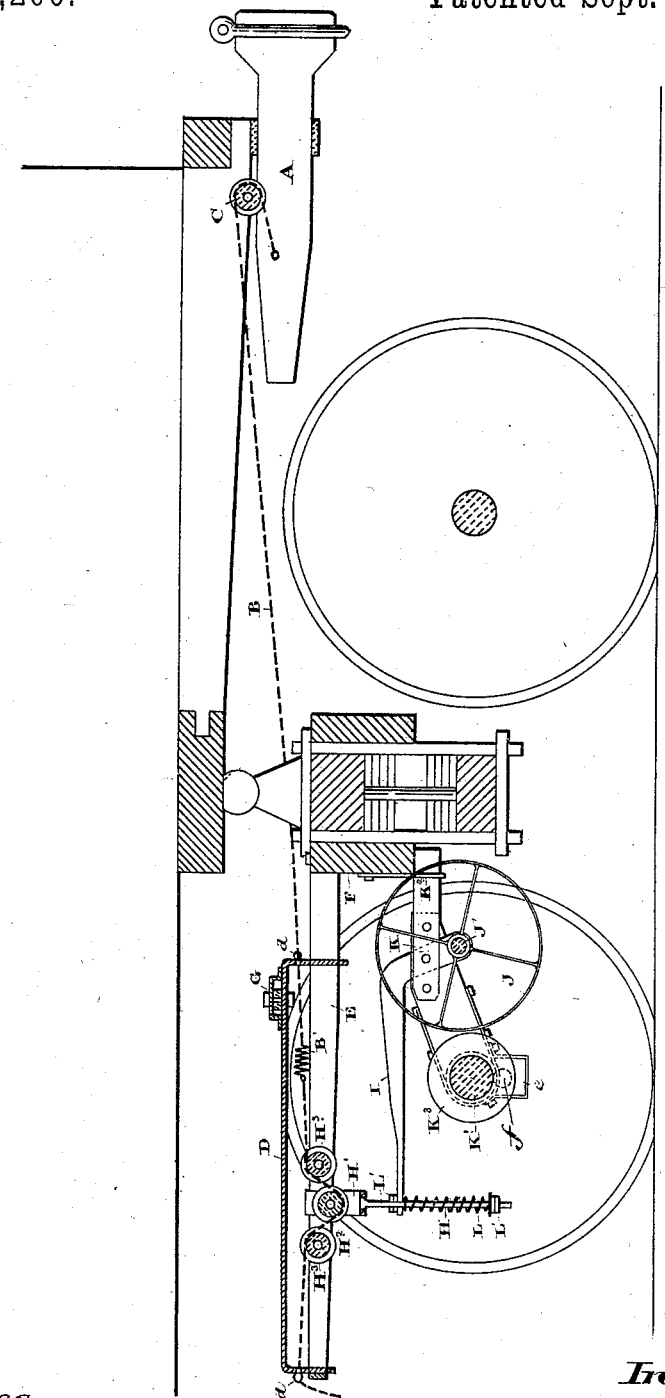
Figure 2:
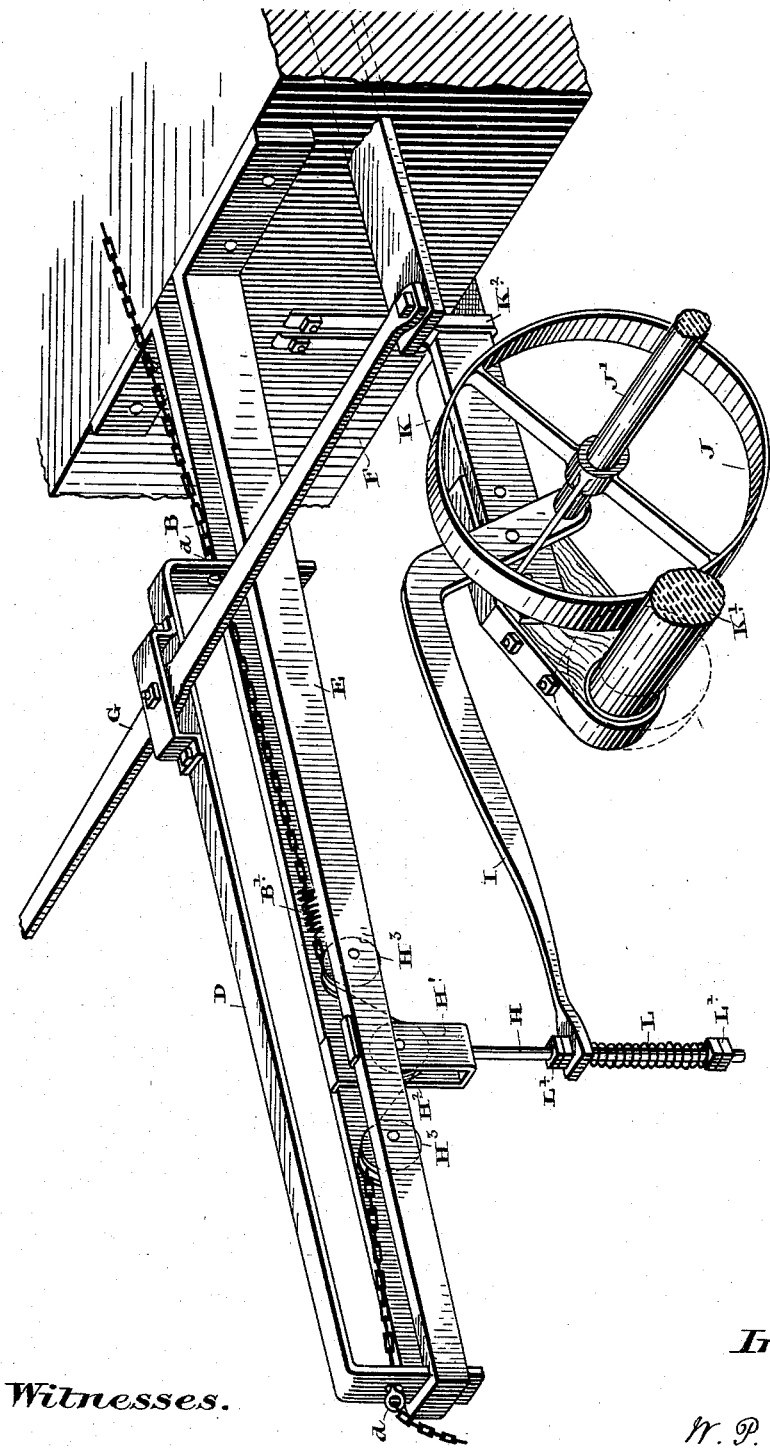

Figure 1 is a sectional side elevation of our friction-brake-operating mechanism. Fig. 2 is a perspective view, showing an enlarged detail of the friction mechanism and the means of operating the same. Fig. 3 is a perspective detail of the reversible clutch-gear for operating the chain connected to the brakes. Figs. 4 and 5 are respectively sectional side and end views of the reversing-clutch. Figs. 6 and 7 are details exhibiting the construction of our paper friction-pulley. Fig. 8 is an enlarged detail, showing an oil-box specially designed for lubricating the journal of the arm arranged to support upon the axle the friction-gear, as hereinafter explained. Fig. 9 is a plan of our friction-brake-operating mechanism applied to a car-truck. Fig. 10 is a skeleton plan, showing the brake mechanism applied to a locomotive. Fig. 11 is a sectional elevation, showing application of the invention to a locomotive-tender.

In the drawings like letters indicate corresponding parts in each figure.

As the principal object of our invention is to arrange the mechanism in such a manner that it will be automatically operated by the movements of the car, we shall proceed to describe the invention from the point where this desired end is effected.

In Fig. 1, A represents the outline of an ordinary draw-head.

B is a chain or rope attached to the draw-head A and passing over, as indicated, a pulley, C, fixed to one of the bottom timbers of the car. The chain B is carried along below the car through holes made in the end of the frame, through the ends of the bar D, and thence to the other end of the car, where it is connected to the draw-head in a similar manner to that shown in the drawings.

On reference to Fig. 2 it will be noticed that the bar D is supported between two parallel bars, E, fixed to and supported by the truck-timber F. A lever, G, pivoted on a bracket extending from one of the truck-timbers, is connected to the bar D, as indicated in Fig. 2. It will thus be seen that the bar D may be longitudinally adjusted upon the parallel bars E by the movement of this lever. This lever may, if desired, be extended to the outside of the car, or to the outside of the truck-frame, so that it can be easily got at in order to adjust the bar D for the purpose hereinafter explained.

H is a spindle provided with a forked head, H', arranged to fit between the parallel bars E, and having a flanged top to rest on the top edge of these bars, as indicated in Fig. 2. Within this forked head a sheave-pulley, $H^2$, is pivoted, as indicated. Corresponding pulleys, $H^3$, are pivoted between the parallel bars E on either side of the forked head H'. After passing through the end of the bar D the chain B passes over the top of the sheave-pulleys $H^3$ and around the bottom of the sheave-pulley $H^2$. It will thus be seen that by tightening the chain B the forked head H', with its spindle H, is lifted as high as the chain will lift it, as it tightens the chain at the loop shown in this figure. A spring, B', placed in the chain, relieves it of any undue strain and provides for the required elasticity in the said chain.

I is a lever attached, as indicated, at one end to the spindle H, and supporting in its other end one end of the shaft J', upon which the friction-pulley J is keyed. This lever I is pivoted to the arm K, supported at one end by the truck-axle K' and at its other end by a staple, K², attached to the truck-timber F, as indicated.

K³ is a friction-pulley fastened to the truck-axle K' immediately in front of the pulley J.

From this description, and on reference to Fig. 2, it will be understood that when the chain B is drawn so as to lift the spindle H the lever I is tilted upon its pivot, so as to throw the friction-pulley J against the friction-pulley K³, and thus if the truck-axle K' is revolving the spindle of the friction-pulley J has imparted to it a corresponding movement. In order to prevent the two friction-pulleys being pressed together with greater force than is necessary, a spiral spring, L, is placed upon the spindle H below the lever I, and as the spindle H passes freely through the end of the lever I the upward movement of the spindle is conveyed to the lever by the spring, which thus relieves the lever of any undue pressure. In order to adjust the connection between the spindle and the lever we provide nuts L', or any other suitable mechanical means may be employed.

On reference to Fig. 3 it will be noticed that the spindle J' is connected to the spindle J² by a flexible joint, J³. This flexible joint permits the free movement of the spindle J' without affecting the spindle J². It also allows the side movement of the latter, caused by the brake-chains, without exerting any strain upon the spindle J'.

M is a clutch fitted to revolve freely on the spindle J², and is provided with two pawls, a, pivoted to it and connected together, as indicated in Fig. 5, so that either one or the other of the pawls will be forced into the notch cut in the spindle J². When the clutch M is set upon the spindle so that the pawls a will be opposite to the notch marked b, as shown in Fig. 4, the said clutch will revolve with the spindle in one direction; but if the spindle is caused to revolve in the other direction it will remain stationary. When it is desired to reverse the action the clutch M is moved upon the spindle J², so as to cause the pawl a to come opposite to the notch marked b'. (See Fig. 4.) This movement is effected by the push-bar N, and the object of the adjustment is to prevent the brakes being applied when the train is backing up.

O is a brake-chain connected to the clutch M at one end and at the other to the brake-rods, which are constructed in the usual manner, it being unnecessary to show them.

Having now described the general construction and arrangement of the mechanism constituting our invention, we shall proceed to explain the operation of the whole and specify in detail any important parts not hereinbefore specified.

On reference to Fig. 2 it will be noticed that stop-blocks d, or enlarged links, are placed on the chain B at either end of the bar D, so as to prevent the said chain from passing through the hole in the said bar beyond the point indicated by the said blocks. By this arrangement when the chain B is drawn from one end it is held to the bar D by the stop-block at the opposite end from which the draft is made, and in this manner the chain between the ends of the bar D is straightened and the spindle H correspondingly raised, as before indicated. On reference to Fig. 1 it will be seen that this is effected by pushing in the draw-head A, the bar D being so adjusted by the lever G that the chain on the side of the bar opposite to that upon which the draw-head is placed hangs loosely. Consequently the inward movement of the draw-head (not shown in the drawings) will not affect the chain between the ends of bar D, and, as before said, the inward movement of the draw-head (shown in the drawings) will cause the spindle H to be lifted. As the friction mechanism is brought into action by the movement of this spindle, it will be seen that it is important that only the front draw-head of the car should be arranged to operate the mechanism. To illustrate the importance of this, we may state that were the back draw-head of the car arranged to set on the brakes the whole car would have to be moved first before the brakes were released, whereas by arranging the mechanism to be operated by the forward draw-head alone the brakes are first released, as the strain is first applied to the draw-head. As the car will be constantly reversed, it will be seen that it is important that whichever draw-head is desired may be arranged to operate the friction mechanism. For that purpose the lever G is arranged to adjust the bar D so as to tighten the chain between the bar and the forward draw-head for the time being which it is intended shall operate the mechanism. When the friction-pulley J is drawn against the friction-pulley K, as described, the spindles J' and J² are caused to revolve, carrying with them the brake-chain, which is connected to the clutch M, as before explained, so that the forward movement of the car only shall cause the clutch to revolve, as it would not be desirable to apply the brakes were the car being pushed back, in which case, while the friction mechanism may be thrown into gear, the movement of the spindle will not apply the brakes.

As explained at the commencement of the specification, the friction-pulley J is carried on an arm, K, supported upon the truck-axle K'. By thus supporting the friction-pulley J upon the axle K' the relative position of the friction-pulley J and friction-pulley K³, which is secured to the axle, will not be affected by the movement of the axle in its box. In order to lubricate the axle-bearing formed on the end of the arm K, we provide an oil-box, e, arranged to fit tightly the end of the arm. This box is filled with oil or grease, and has placed within it a small roller or ball, *f*. This ball is made extremely light, being hollow and formed of light sheet metal, and is calculated to float upon the oil contained within the box *e*. This roller is arranged to come in contact with the axle. The movement of the axle therefore causes it to revolve, and in this manner the oil is transferred from the box upon the axle, which is thereby lubricated.

On reference to Figs. 6 and 7 the construction of the friction-pulley K³ will be seen. This pulley is composed of compressed paper formed into segments to fit around the axle of the car. The ring P is rigidly secured to the axle, while the ring Q is fitted to the axle so that it can slide longitudinally upon it. The pulley K³ is held between these two rings, and is secured there by compression caused by the action of the set-screws P', which are secured through the ring Q', keyed or otherwise fastened to the axle. By this arrangement the paper pulley, when worn out, can easily be replaced by a new one at any time without removing the wheels from the axle. In order to cause the brakes to be applied automatically, it is necessary that the engine or one of the front cars should be first checked. In order to effect this, an arrangement for applying the brakes to the front car should be made.

In Fig. 10 we show a plan intended to represent a system of brakes arranged to be applied to the tender-trucks and to the main driving-wheels of the locomotive. In this figure R represents the main driving-wheels of the locomotive, which wheels are provided with brakes on either side of them, operated by brake-levers arranged as indicated, a bar, S, being connected by rods to the brake-levers S' and S² for operating the brakes of the main driving-wheels, while the bar S³ is connected by a chain to the spindle J², which is operated by our friction-gear in the manner before explained. In order to apply this friction, we attach one end of the chain B to the parallel bars E, dispensing with the bar D, used when the arrangement is made automatic. The chain in this instance passes around the pulleys H² and H³, and is connected at its other end to an ordinary hand-brake spindle, T, which is applied by the engine-driver. While we think the arrangement of applying the brakes to the main driving-wheel of great importance, it will of course be understood that the arrangement of applying the brakes to the front car might be used instead; but we are sure that the beneficial effect produced by braking the main driving-wheels will insure the adoption of the plan we have illustrated.

Fig. 11 shows the braking attachment operated by the hand-brake spindle.

What we claim as our invention is—

1. In an apparatus for applying the brakes of railroad-cars in which the power is derived from a friction-pulley applied to one of the revolving axles, a crank-lever pivoted at a point near the axle and supporting on its short arm the axle of the friction-pulley, to which axle the brake-chain is attached, in combination with a spindle passing through and attached to the lever, and provided with a pulley around which a chain or rope leading from the draw-bar passes, after passing over stationary pulleys situated above it, so that the tightening of the chain will raise the spindle a given height, but no higher, and with a spring in said chain to cushion the force, substantially as and for the purpose specified.

2. In an apparatus for operating railroad-car brakes in which an adjustable friction-pulley operating against the revolving axle of the car is employed for tightening the ordinary brake-chain, a shaft formed in two parts, each part carried in independent bearings, the part to which the adjustable friction-pulley is keyed being journaled on a crank-lever pivoted on an arm journaled on the truck-axle, and the part to which the brake-chain is connected being journaled on brackets secured to the truck-frame, in combination with a universal joint, J², arranged to connect the two parts together, and with a pivoted brake-pulley, J, substantially as and for the purpose specified.

3. In a car-brake, a friction-pulley, K³, composed of compressed paper made in semicircular segments to fit the car-axle, and having a fixed ring, P, and adjustable ring Q, combined, and adapted to serve with means for operating the brake-chain, substantially as set forth.

4. The car-axle having friction-pulley K³ made in sections of compressed paper, the ring P, adjustable ring Q, and set-screw Q', combined with the friction-pulley J, as and for the purposes set forth.

5. In an apparatus for applying the brakes of railroad-cars in which a friction-pulley for imparting movement to the brake-winding mechanism is operated by the tightening of a chain or rope attached to the draw-head of the car, an adjustable bar, D, supported between two parallel bars, E, fixed to the truck-timber F, in combination with stop-blocks *d*, placed, as described, on the operating chain or rope for the purpose of holding the said chain on one side of the spindle H while being drawn upon by the compression of the draw-head on the other side of said spindle, substantially as and for the purpose specified.

6. The chain or cord B, having spring B' and stop *d*, combined with the adjustable bar D, and with the friction-pulley J and connections, as specified.

7. The arm K, furnishing journal for the axle K', and the oil-cup *e*, having communication with such journal, combined with the float or roller *f*, as and for the purposes set forth.

8. The spindle J², having reverse recesses *b b'*, and the clutch-disk M, having reverse pawls *a a*, combined with the push-bar N, as set forth.

9. In an apparatus for applying the brakes of railway-cars in which the brakes are applied by the winding of the brake-chain upon a spindle caused to revolve by friction mechanism operated by one of the car-axles, the clutch M, having the brake-chain O connected to it, and the pawls $a$, pivoted upon its face, in combination with the notches $b$ and $b'$, formed, as described, in the spindle $J^2$, upon which the clutch M is journaled, and the rod N, for adjusting the said clutch, substantially as and for the purpose specified.

10. The chain B, having spring $B'$, and the spring L, combined and adapted to serve with the pulley J, axle $K'$, and their connections to cushion the force applied through the chain, as specified.

W. P. WIDDIFIELD.
A. T. BUTTON.

Witnesses:
GEO. BETTES,
A. D. WILLIAMS.